(12) United States Patent
Aono et al.

(10) Patent No.: US 6,459,984 B1
(45) Date of Patent: *Oct. 1, 2002

(54) INTAKE AIR FLOW RATE MEASUREMENT APPARATUS

(75) Inventors: Toshihiro Aono, Chiyoda-machi; Takehiko Kowatari, Kashiwa, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/985,304

(22) Filed: Nov. 2, 2001

Related U.S. Application Data

(62) Division of application No. 09/417,007, filed on Oct. 12, 1999, now Pat. No. 6,334,083.

(30) Foreign Application Priority Data

Mar. 15, 1999 (JP) .............................. 11-67843

(51) Int. Cl.⁷ .......................... G01M 15/00; F02D 41/18
(52) U.S. Cl. ..................................... 701/102; 73/118.2
(58) Field of Search .............................. 701/101, 102, 701/114, 115; 73/118.2

(56) References Cited

U.S. PATENT DOCUMENTS

| 5,817,932 A | 10/1998 | Nishimura et al. ........ 73/118.2 |
| 5,832,403 A | 11/1998 | Kowatari et al. .......... 73/118.2 |
| 6,334,083 B1 * | 12/2001 | Aono et al. .................. 701/102 |

FOREIGN PATENT DOCUMENTS

| DE | 19538451 | 11/1996 |
| JP | 7167697 | 7/1995 |
| JP | 7239260 | 9/1995 |
| JP | 10300544 | 11/1998 |
| JP | 1183584 | 3/1999 | ............. G01F/1/68 |

* cited by examiner

Primary Examiner—Andrew M. Dolinar
(74) Attorney, Agent, or Firm—Antonelli, Terry, Stout & Kraus, LLP

(57) ABSTRACT

An intake air flow rate measurement apparatus for measuring a flow rate of intake air taken in an internal combustion engine, using an electrothermal resistor type air flowmeter, includes a delay/non-linearity correction part to perform correction of an output signal of the electrothermal resistor type air flowmeter for a response delay and a non-linearity of the electrothermal resistor type air flowmeter; a waveform feature value extraction part to extract feature values of a waveform of an output signal which has been sent from said electrothermal resistor type air flowmeter and has been corrected for said response delay and non-linearity by the delay/non-linearity correction part; a back flow calculation part to obtain a back flow ratio based on the extracted waveform feature values; and a flow rate calculation part to obtain a correct flow rate of the intake air based on an output of the delay/non-linearity correction part and an output of the back flow ratio calculation part.

4 Claims, 12 Drawing Sheets

FIG. 9A

| f(Δt) |
|---|
| f(2Δt) |
| ⋮ |
| f(TΔt) |

FIG. 9B

| $\lambda_1$ |
|---|
| ⋮ |
| $\lambda_I$ |

$\lambda_i = \omega_i / \omega_0$

FIG. 9C

| $\omega_0$ | $F(\omega_0)$ |
|---|---|
| ⋮ | ⋮ |
| $\omega_I$ | $F(\omega_I)$ |

FIG. 9D

| $\phi_{11}$ | | $\phi_{1K}$ |
|---|---|---|
| ⋮ | | ⋮ |
| $\phi_{I1}$ | | $\phi_{IK}$ |
| $\gamma_{111}$ | | $\gamma_{11K}$ |
| ⋮ | | ⋮ |
| $\gamma_{1I1}$ | | $\gamma_{1IK}$ |
| ⋮ | | ⋮ |
| $\gamma_{Ij1}$ | | $\gamma_{IjK}$ |
| ⋮ | | ⋮ |
| $\gamma_{IJ1}$ | | $\gamma_{IJK}$ |

BACK FLOW RATIO
$= \sum_{ik} \phi_{ik} F(\omega_i)^k + \sum_{ijk} \gamma_{ijk} [F(\omega_i)/F(\omega_j)]^k$

INTAKE AIR FLOW RATE MEASUREMENT APPARATUS

This is a divisional application of Ser. No. 09/417,007, filed Oct. 12, 1999, now U.S. Pat. No. 6,334,083 B1 the entire disclosure of which is hereby incorporated by reference.

BACKGROUND OF THE INVENTION

The present invention relates to an intake air flow rate measurement apparatus of the type used to measure the intake air flow rate in an internal combustion engine; and, more particularly, the invention relates to an intake air flow rate measurement apparatus with which that the intake air flow rate can be correctly measured based on the waveform of a signal output from an electrothermal resistor type air flowmeter, such as a hot-wire type flowmeter.

The flow rate of an intake air flow into an internal combustion engine has been generally measured with a hot-wire type air flowmeter. The hot-wire type air flowmeter is arranged in an air intake passage and measures the flow rate of intake air passing the cross section of the air intake passage by measuring the required amount of electric current to be fed to a hot-wire of the air flowmeter in order to maintain the temperature of the wire at a constant value. Since the hot-wire type air flowmeter can measure only the absolute value of an air flow rate, this type of air flowmeter cannot discriminate the direction of the air flow being measured.

In an internal combustion engine, a pulsation is caused in the intake air flow due to the up and down motions of the pistons in the cylinders. Accordingly, the air flow rate at the cross section of the air flow passage at which the hot-wire is arranged indicates periodic changes. If the opening of a throttle valve becomes large, the amplitude of the pulsation also becomes large, and the intake air sometimes temporarily flows in the negative (reverse) direction in the air flow passage. This reverse flow is called a back flow. Therefore, since the hot-wire type air flowmeter can detect only the absolute value of an air flow rate, the air flow rate detected by the hot-wire air flowmeter is not correct when back flow occurs.

Further, the hot-wire air flowmeter possesses a response delay due to its heat capacity. Furthermore, the relation between the value of a signal output from the hot-wire type air flowmeter and the actual air flow rate is nonlinear. If the output signal of the hot-wire type air flowmeter, which is affected by the response delay and this non-linearity, is integrated as it is, the amount of intake air sucked into the internal combustion engine will be overestimated by the amount corresponding to the back flow.

Conventional methods to solve the above problems have been devised.

For example, in a method disclosed in Japanese Patent Application Laid-Open Hei. 10-300544, a threshold value is set based on maximum and minimum values of a signal output from a hot-wire type air flowmeter, the direction of intake air flow in signals output from the air flowmeter is judged using the set threshold value, and an interval of back flow is determined. Further, the correct air flow rate is obtained by correcting the detected signal based on the determined interval of back flow.

Moreover, in a method disclosed in Japanese Patent Application Laid-open Hei. 7-167697, maximum and minimum values of a signal output from a hot-wire type air flowmeter are detected, and the time which has elapsed between detection of the maximum to minimum values is obtained. Then, an interval of back flow is determined based on the elapsed time, and the output signal of the air flowmeter is corrected based on the determined interval of back flow.

Furthermore, in a method disclosed in Japanese Patent Application Laid-Open Hei. 7-239260, a map in which the relationship between values of the flow rate of back flow and the opening of a throttle valve and a map in which the relationship between the flow rate of a back flow and the change amount of the crank angle are prepared in advance, and the output signal of the air flowmeter is corrected using an amount of back flow calculated on the basis of the above maps, the detected opening of the throttle valve and the change amount of the crank angle.

Although the occurrence of back flow is determined by checking whether the output signal of the air flowmeter goes below a threshold value in the method disclosed in Japanese Patent Application Laid-Open Hei. 10-300544, it sometimes becomes impossible due to noise components in the output signal of the air flowmeter to clearly determine whether the output signal of the air flowmeter goes below the threshold value. Therefore, this method is not practically reliable.

Further, although maximum and minimum values of signals output from a hot-wire type air flowmeter are detected in the method disclosed in Japanese Patent Application Laid-Open Hei. 7-167697, pseudo-maximum and pseudo-minimum values are sometimes detected due to noise components in the output signals of the air flowmeter. Therefore, this method is also not practically reliable.

Furthermore, in the method disclosed in Japanese Patent Application Laid-open Hei. 7-239260, it is necessary to prepare a map which defines the relationship between the flow rate of a back flow and the opening of a throttle valve and a map which defines the relationship between the flow rate of back flow and the change amount of the crank angle for each internal combustion engine in advance. Therefore, if any change is made an air intake system, these maps must be renewed.

SUMMARY OF THE INVENTION

An object of the present invention is to provide an intake air flow rate measurement apparatus for an internal combustion engine, which is capable of performing back flow correction without determining the back flow interval based on obtained threshold values and detected extreme values or preparing maps defining the relationship between the flow rate of a back flow and paired variables of the opening of a throttle valve and the change amount of a crank angle.

To attain the above object, the present invention provides an intake air flow rate measurement apparatus for measuring a flow rate of intake air in an internal combustion engine, using an electrothermal resistor type air flowmeter, the intake air flow rate measurement apparatus comprising: a back flow ratio calculation part which operates to calculate a back flow ratio based on feature values of a waveform of changes in a measured flow rate of the intake air; and a flow rate calculation part which operates to calculate a correct flow rate of the intake air based on the waveform of the measured flow rate of the intake air and the back flow ratio output from the back flow ratio calculation part.

Further, in the above intake air flow rate measurement apparatus, values of the measured flow rate are obtained by performing correction of an output signal of the electrothermal resistor type air flowmeter for a response delay and a non-linearity of the electrothermal resistor type air flowmeter.

Moreover, the present invention provides an intake air flow rate measurement apparatus for measuring a flow rate of intake air in an internal combustion engine, using an electrothermal resistor type air flowmeter, the intake air flow rate measurement apparatus comprising: a delay/non-linearity correction part which operates to perform correction of an output signal of the electrothermal resistor type air flowmeter for a response delay and a non-linearity of the electrothermal resistor type air flowmeter; a waveform feature value extraction part which operates to extract feature values of a waveform of an output signal which has been sent from the electrothermal resistor type air flowmeter and has been corrected for the response delay and non-linearity by the delay/non-linearity correction part; a back flow calculation part which operates to obtain a back flow ratio based on the extracted waveform feature values; and a flow rate calculation part which operates to obtain a correct flow rate of the intake air based on an output of the delay/non-linearity correction part and an output of the back flow ratio calculation part.

Furthermore, in the above intake air flow rate measurement apparatus, the waveform feature values include the frequency component strength of the waveform of the output signal which has been sent from the electrothermal resistor type air flow meter and has been corrected for the response delay and non-linearity corrected by the delay/non-linearity correction part.

Also, the present invention provides an intake air flow rate measurement apparatus for measuring a flow rate of intake air in an internal combustion engine, using an electrothermal resistor type air flowmeter, the intake air flow rate measurement apparatus comprising: an input/output port; a memory to which a waveform of an output signal sent from the electrothermal resistor type air flowmeter is input via the input/output port, and which operates to store a relationship between designated angular frequencies at which a frequency component strength is to be obtained and a crank angular frequency in the engine; and a calculation apparatus which operates to correct an output signal of the electrothermal resistor type air flowmeter for a response delay and a non-linearity of the electrothermal resistor type air flowmeter, by obtaining the crank angular frequency in the engine, calculating a frequency component strength of the waveform of the output signal, which has been sent from the electrothermal resistor type air flowmeter and has been corrected for the response delay and non-linearity, at each designated angular frequency which is obtained using the stored relationship between the designated angular frequencies and the crank angular frequency, obtaining a back flow ratio based on the calculated frequency component strength, obtaining a correct flow rate of the intake air by correcting the waveform of the output signal, which has been sent from the electrothermal resistor type air flowmeter and has been corrected for the response delay and non-linearity, with the back flow ratio, and outputting the correct flow rate of the intake air from the input/output port.

Further still, in the above intake air flow rate measurement apparatus, the crank angular frequency is obtained using the output signal sent from the. electrothermal resistor type air flow meter.

On top of that, in the above intake air flow rate measurement apparatus, the crank angular frequency is obtained using an output signal sent from a crank angle sensor provided in the engine.

BRIEF DESCRIPTION OF THE DRAWINGS

FIGS. 9A–9D are diagrams showing an arrangement of data stored in respective memories provided in the intake air flow rate measurement apparatus according to the present invention.

DETAILED DESCRIPTION OF THE EMBODIMENTS

Figure 3:
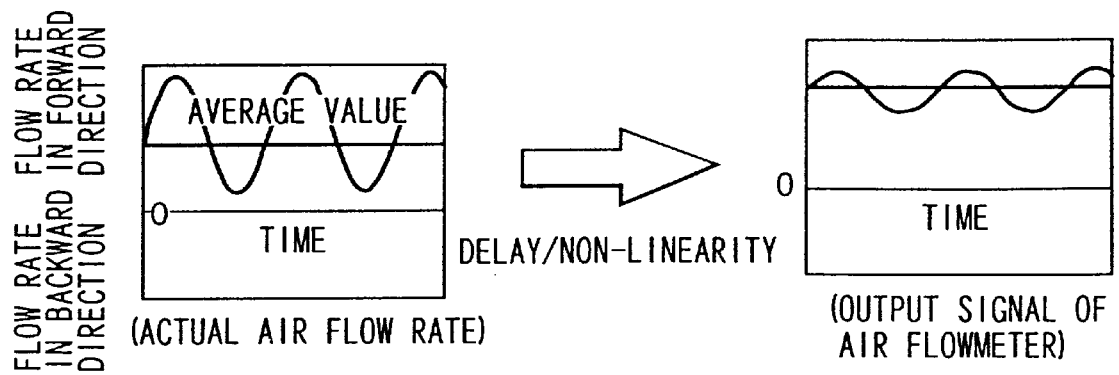
FIG. 3 is a diagram conceptually showing the measurement characteristics of a hot-wire type air flowmeter.
Figure 4:
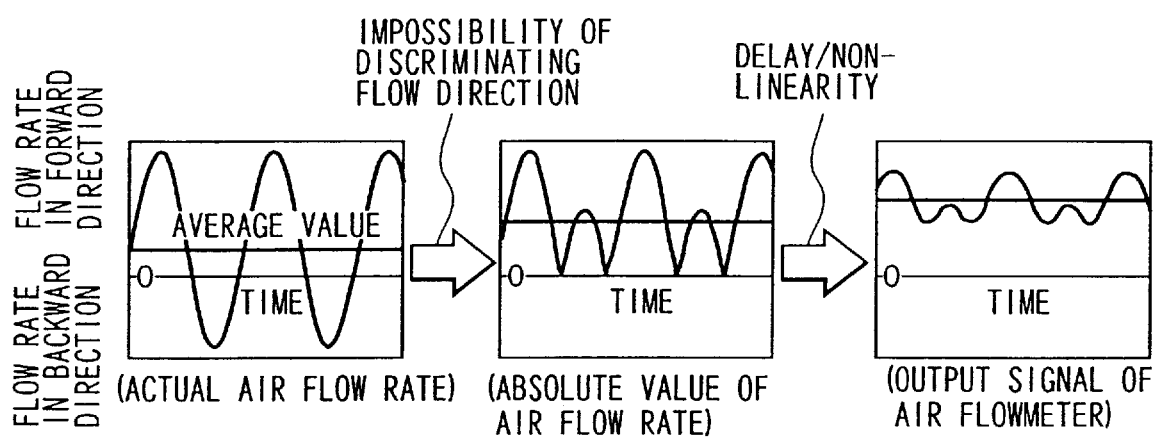
FIG. 4 is a diagram conceptually showing the measurement characteristics of a hot-wire type air flowmeter.

Hereafter, details of the embodiments according to the present invention will be explained with reference to the drawings. FIGS. 3 and 4 conceptually show the measurement characteristics of a hot-wire type air flowmeter.

In an internal combustion engine, a pulsation is caused in the intake air flow due to the up and down motions of the pistons in the cylinders. Accordingly, the air flow rate at the cross section of the air flow passage at which the hot-wire is arranged indicates a waveform such as that shown at the left side in FIG. 3. However, the actual waveform of a flow rate signal output from the hot-wire air flowmeter is shown in the central portion of FIG. 4, which shows the effect on the waveform of the non-linearity and the response delay of the hot-wire air flowmeter.

If the opening of the throttle valve becomes large, the amplitude of the pulsation also becomes large, and the intake air sometimes temporarily flows in the negative (reverse) direction as shown in the left side in FIG. 4. This reverse flow is called a back flow. Since the hot-wire type air flowmeter can detect only the absolute value of an air flow rate, the air flow rate detected by the hot-wire air flowmeter is represented by a waveform such as that shown in the central portion in FIG. 4 when the back flow occurs. Further, the final waveform of the signal output from the hot-wire air flowmeter is shown that shown in the right side in FIG. 4, wherein the waveform is affected by the non-linearity and the response delay of the air flowmeter.

Figure 5:
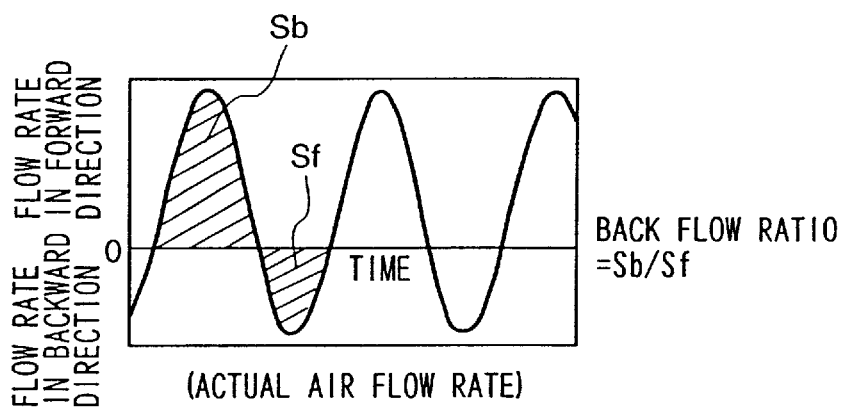
FIG. 5 is a diagram illustrating the back flow ratio.

In accordance with the present invention, a waveform feature of a signal output from the hot-wire type air flowmeter is analyzed, and waveform feature values of the signal are calculated. Further, the back flow ratio is obtained based on the waveform feature values. On the other hand, by correcting the output signal of the hot-wire type air flowmeter for its response delay and non-linearity, the absolute value of the air flow rate shown in the central portion in FIG. 4 is restored. Further, an average value of the absolute value of the air flow rate is calculated. Furthermore, by correcting the calculated average value with the back flow ratio, the correct air flow rate is obtained. The above-described processing indicates the fundamental concept of the present invention. Here, the back flow ratio is defined as the value obtained by dividing an area of the negative (backward) direction flow region with an area of the positive (forward) direction flow region, as shown in FIG. 5. That is, the back flow ratio R is expressed by the equation (1).

$$R = Sb/Sf \tag{1}$$

Figure 8A:
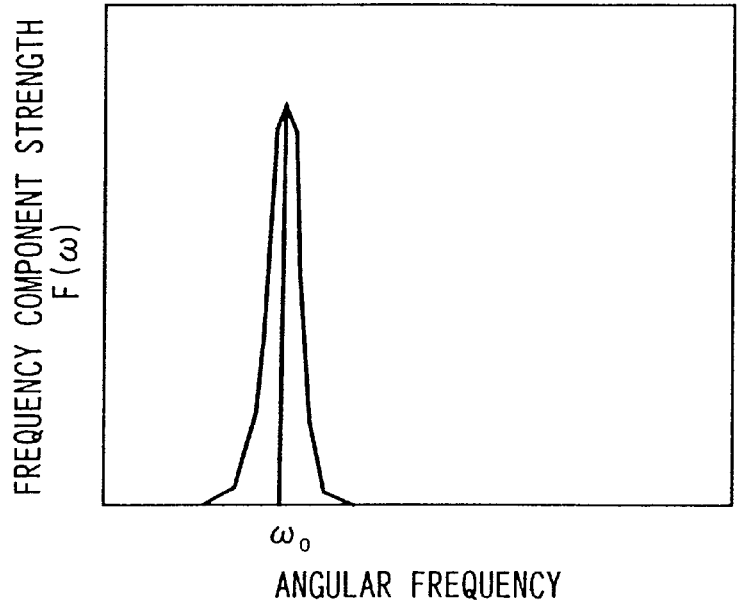
FIGS. 8A and 8B are graphs showing the frequency spectrum of signals output from a hot-wire type air flowmeter.

A frequency spectrum of a waveform of the signal output from the hot-wire type air flowmeter is shown in FIG. 8A in the case where the back flow is not occurring, as shown in FIG. 3. The strength $F(\omega)$ of a frequency component at an angular frequency $\omega$ (referred to as the frequency component strength) is very strong in the vicinity of the crank angular frequency $\omega 0$, and that at the other angular frequencies is very low.

Figure 8B:
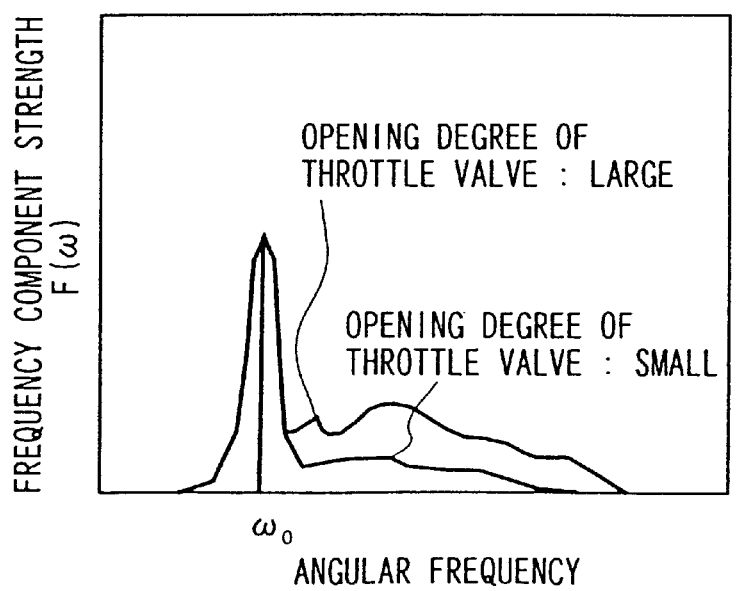

On the other hand, the frequency spectrum of a waveform of the signal output from the hot-wire type air flowmeter is shown in FIG. 8B in the case where the back flow is occurring, as shown in FIG. 4. Frequency components with comparatively large strength appear in the region of frequencies higher than the crank angular frequency $\omega 0$ When the opening of the throttle valve becomes larger, the strength and the region of these higher frequency components become stronger and wider, respectively. Thus, in accordance with the present invention, the back flow ratio is obtained by calculating feature values of a waveform of the air flow rate, for example, the power of frequency components of a frequency spectrum of a waveform of the output signal of the hot-wire type air flowmeter, and the output signal is corrected with the obtained back flow ratio.

Figure 1:
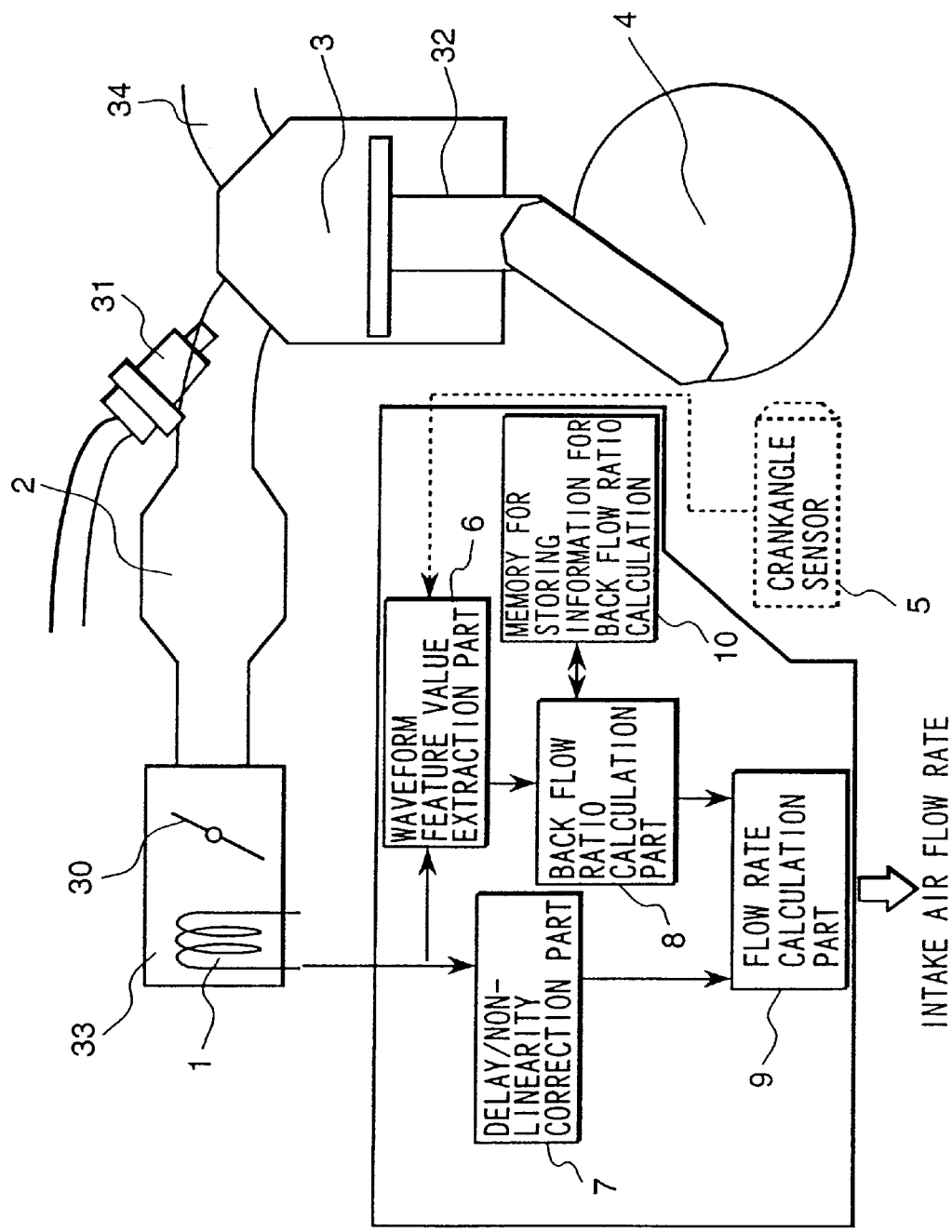
FIG. 1 is a diagram schematically showing the whole composition of an intake air flow rate measurement apparatus representing an embodiment according to the present invention.

At first, the composition of an internal combustion engine to which the present invention is applied will be explained. FIG. 1 schematically shows the overall composition of an intake air flow rate measurement apparatus for an internal combustion engine according to the present invention.

As shown in FIG. 1, in the internal combustion engine of a car, a piston 32 in each cylinder 3 is reciprocated up and down, and the reciprocatory movement of the piston 32 is converted to a rotational movement by a crank 4. Further, this rotational movement is transmitted to wheels of the car. An air intake pipe and an exhaust pipe for expelling exhaust gas are provided at one side and the other side of the cylinder 3 in which the piston 32 is reciprocated up and down. Moreover, a fuel feed device 31 to feed fuel, such as gasoline, is provided at the air intake pipe or at each cylinder 3. Intake air is sucked from an air cleaner (not shown in the figure), and is fed to the cylinder 3 via a throttle chamber in an air intake duct 33 and a manifold 2. Furthermore, a throttle valve 30 linked to an acceleration pedal (not shown in the figure) is provided in the throttle chamber. In the air intake duct 33, the hot-wire type air flowmeter 1 is provided to measure the flow rate of air flowing into the air intake duct 33.

An output signal of the hot-wire type air flowmeter 1 is input to the intake air flow rate measurement apparatus, and a correct air flow rate is obtained by correcting the output signal. Further, an air flow control in an engine control is performed on the basis of the corrected air flow rate.

The composition of the air flow rate measurement unit according to the present invention is also shown in FIG. 1. The output signal of the hot-wire type air flowmeter 1 is input to a delay/non-linearity correction part 7 and a waveform feature value extraction part 6. The waveform feature value extraction part 6 also takes in a signal output from a crank angle sensor 5, and obtains feature values of a waveform of the output signal sent from the hot-wire air flowmeter 1. Further, a back flow ratio calculation part 8 obtains the back flow ratio based on the obtained waveform feature values and information used for back flow calculation. Furthermore, a flow rate calculation part 9 obtains the correct air flow rate based on the outputs of the delay/non-linearity correction part 7 and the back flow ratio calculation part 8, and outputs the obtained correct air flow rate.

Figure 2:
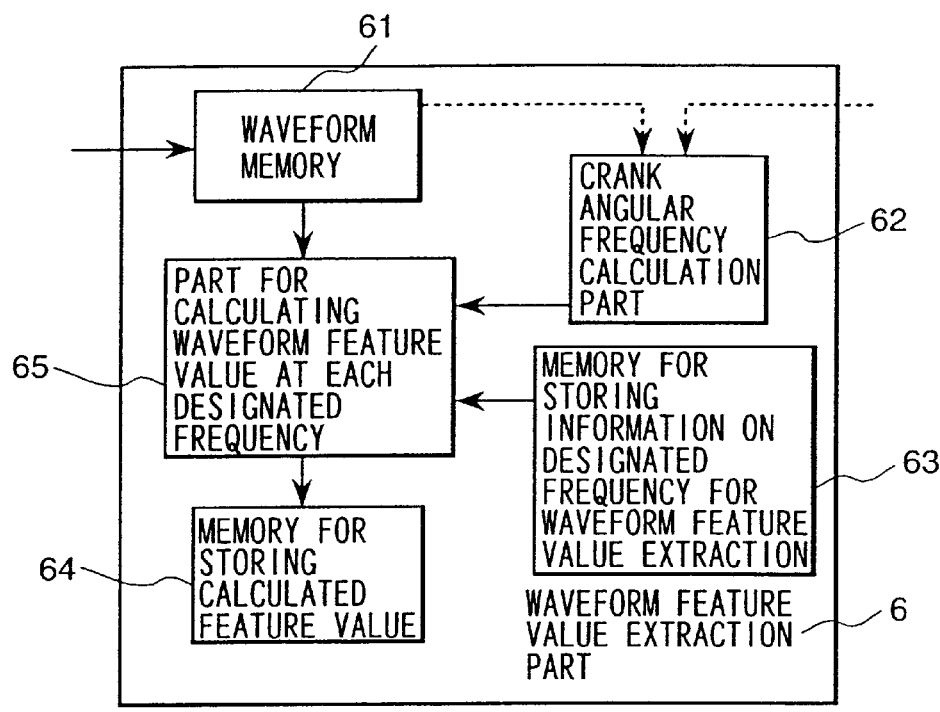
FIG. 2 is a schematic block diagram showing the composition of the waveform feature value extraction part in the intake air flow rate measurement apparatus shown in FIG. 1.

Next, the waveform feature value extraction part 6 will be explained in detail with reference to FIG. 2. FIG. 2 shows main parts composing the waveform feature value extraction part 6. The signal output from the hot-wire air flowmeter 1 is input to a waveform memory 61, and the waveform memory temporarily stores the input signal. Further, information of the stored input signal is input to a crank angular frequency calculation part 62 and a frequency component strength calculation part 65. The crank angular frequency calculation part 62 also takes in a signal output from a crank angle sensor 5, and obtains a crank angular frequency based on a fundamental angular frequency obtained using the waveform of the signal stored in a wave memory 61 or the signal received from the crank angle sensor 5. A frequency component strength calculation part 65 obtains the strength of frequency components at frequencies set by multiplying the crank angular frequency by multipliers designated in advance. The obtained strength of each frequency component is stored as a waveform feature value.

Figure 6:
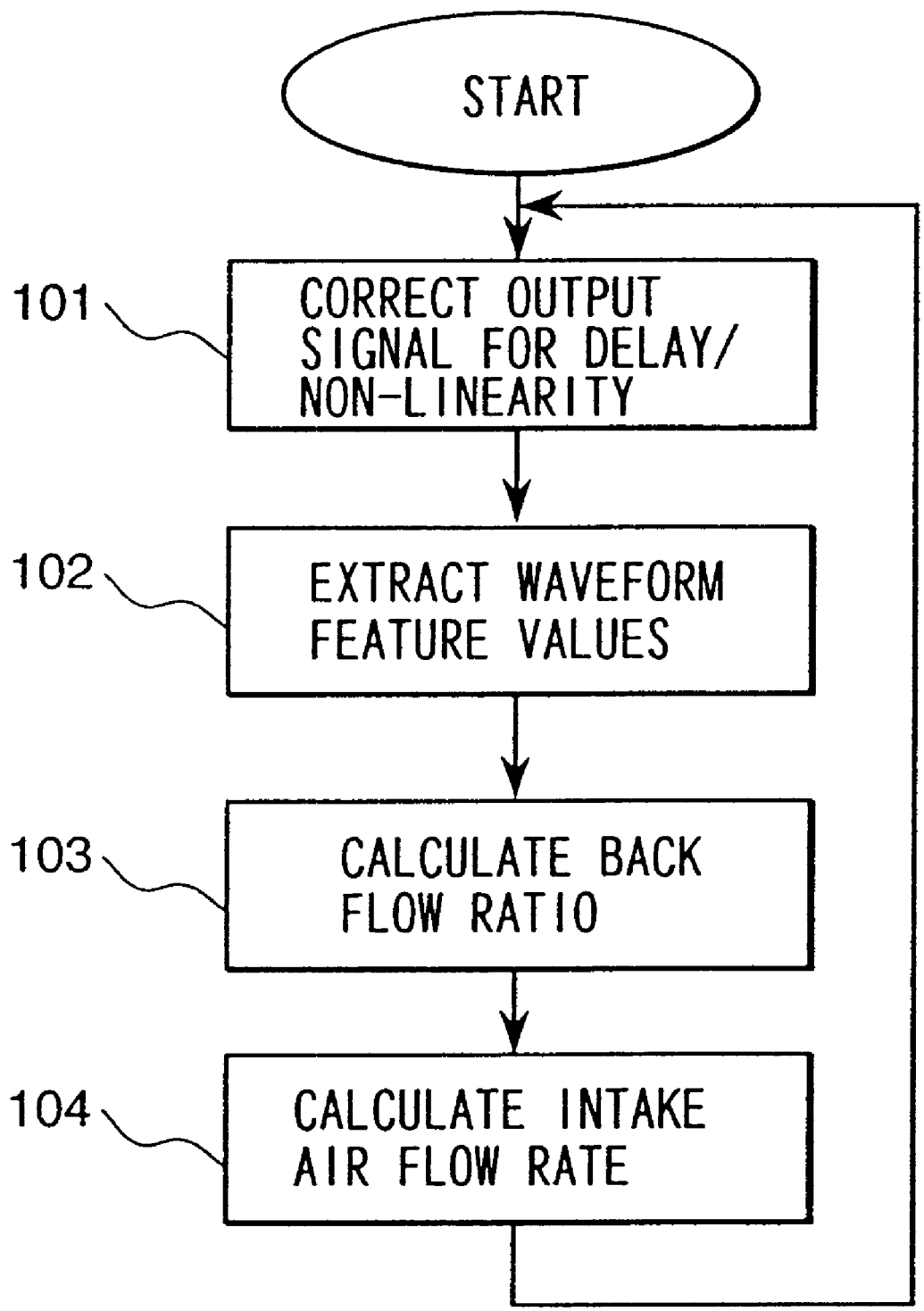
FIG. 6 is a flow chart of the fundamental processing performed by the intake air flow rate measurement apparatus according to the present invention.

The fundamental processing performed by the intake air flow rate measurement apparatus according to the present invention will be explained with reference to the flow chart shown in FIG. 6. The waveform of the output signal of the hot-wire type air flowmeter 1 is blunter than that of the actual air flow rate. Moreover, the relationship between the output signal of the hot-wire type air flowmeter and the actual air flow rate is not linear. Accordingly, it is necessary to correct the output signal of the hot-wire type air flowmeter for the response delay and the non-linearity of the air flowmeter.

At first, in step 101, the response delay and the non-linearity in the output signal of the hot-wire type air flowmeter 1 is corrected by the delay/non-linearity correction part 7. Next, in step 102, the waveform feature values are obtained based on the corrected output signal of the hot-wire type air flowmeter 1. In step 103, the back flow ratio is calculated using the obtained waveform feature values. Finally, in step 104, the correct air flow rate is calculated based on the calculated back flow ratio. By the above processing, the flow rate of intake air taken into each cylinder 3 is correctly obtained, and an optimal engine control can be implemented using the obtained correct flow rate of intake air.

Figure 7A:
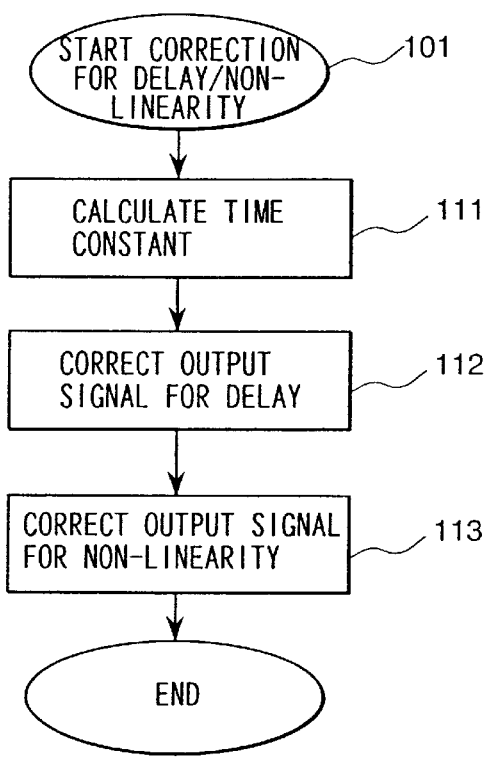
FIGS. 7A–7D are detailed flow charts illustrating the fundamental processing shown in FIG. 6.

Detailed processing to implement the function of the delay/non-linearity correction part 7 will be explained with reference to FIG. 7A.

At first, in step 111, the time constant of the hot-wire type air flowmeter 1 is obtained.

Assuming that the response delay in the output signal Ms of the hot-wire type air flowmeter 1 is a first order delay, the time constant τ is generally expressed by a function of the actual flow rate Md, and is calculated using the equation (2).

$$\tau = C_0 \times Md^{-C_1} \qquad (2)$$

For example, in an experiment, the following values were obtained, that is, $C_0=0.02$, and $C_1=0.48$. The value of Md obtained in the previous calculation step is used for calculating the time constant τ used for the present calculation step. That is, by inputting the correct flow rate Md obtained in the previous calculation step into the equation (2), the time constant τ is obtained.

Further, in step 112, the response delay in the output signal Ms of the hot-wire type air flowmeter 1 is corrected with the equation 3.

$$Mc = Ms + \tau \times \frac{Ms - Ms(-1)}{\Delta t}, \qquad (3)$$

where Ms(−1) is the value of the output signal, which was taken in the previous calculation step, of the hot-wire type air flowmeter 1, and Δt is a sampling interval.

The output signal of the hot-wire type air flowmeter 1, whose response delay has been corrected, is further corrected for its non-linearity by using the equation (4).

$$Md = D_0 + D_1 Mc + D_2 Mc^2 + D_3 Mc^3 + D_4 Mc^4 \qquad (4),$$

where the coefficients $D_0$, $D_1$, $D_2$, $D_3$, and $D_4$ are obtained in advance from the relationship between the output signals of the hot-wire type air flowmeter 1 and the flow rate-s of air flow in a steady state. Meanwhile, the order of the polynomial (4) for the non-linearity correction is not restricted to the fourth order. The output signal of the hot-wire type air flowmeter 1 is further corrected using the equation (4). After this correction, the absolute value of the corrected flow rate Md is restored and output from the delay/non-linearity correction part 7.

Figure 7B:
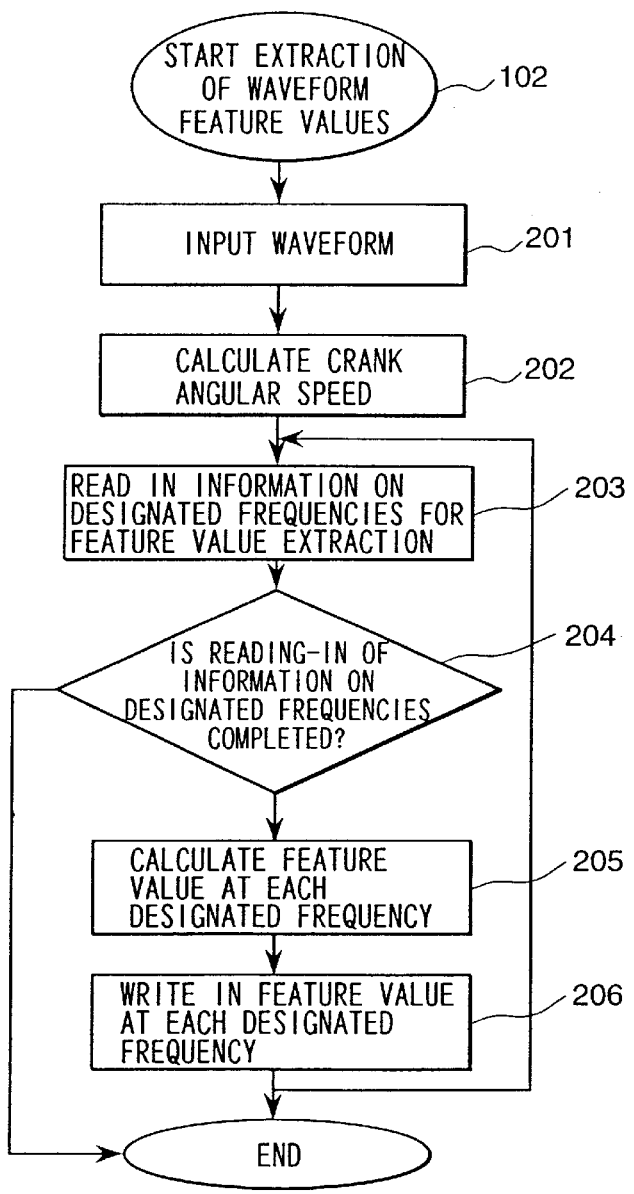

Next, the processing goes to step 102 in which waveform feature values are extracted. The waveform feature values extraction part 6 calculates the waveform feature values used for calculating the back flow ratio. The processing flow for extracting the waveform feature values will be explained with reference to FIG. 7B.

At first, in step 201, the waveform in the output signal of the hot-wire type air flowmeter 1 for the latest calculational period is input to the waveform memory 61. The output signal values of the hot-wire type air flowmeter 1 are stored in the waveform memory 61 in one dimensional arrangement as shown in FIG. 9A.

In step 202, the crank angular speed calculation part 62 obtains the crank angular frequency ω0 by differentiating changes of the crank angle sent from the crank angle sensor 5 or by determining the lowest frequency in the frequencies at which peaks appear in the spectrum of the waveform of the hot-wire type air flowmeter 1 stored in the waveform memory 61 as the crank angular frequency ω0.

The ratios of the designated frequencies at which the waveform feature values should be extracted to the crank angular frequency ω0 are stored as multipliers λi in the designated frequency memory 63 in a one dimensional arrangement as shown in FIG. 9B. After the crank angular frequency ω0 is calculated, in step 203, the waveform feature value calculation part 65 reads out the multipliers λi from the memory 63 for storing multipliers in turn. In step 204, it is determined whether or not any multiplier remains. If no multiplier remains, the processing of the waveform feature value extraction ends, otherwise, the processing goes to the next step in the waveform feature value extraction.

In step 205, the frequency component strength calculation part 65 obtains each designated frequency, at which it is required to calculate a frequency component strength, by multiplying the crank angular frequency ω0 by each multiplier λi, and calculates each frequency component strength $F(\omega_1)$ by reading out the waveform of the output signal of the hot-wire type air flowmeter 1 from the waveform memory 61 and executing a Fourier-transform on the read-out waveform. In step 206, each calculated frequency component strength $F(\omega_i)$ is stored in the memory 64 for storing waveform feature values.

Figure 7C:
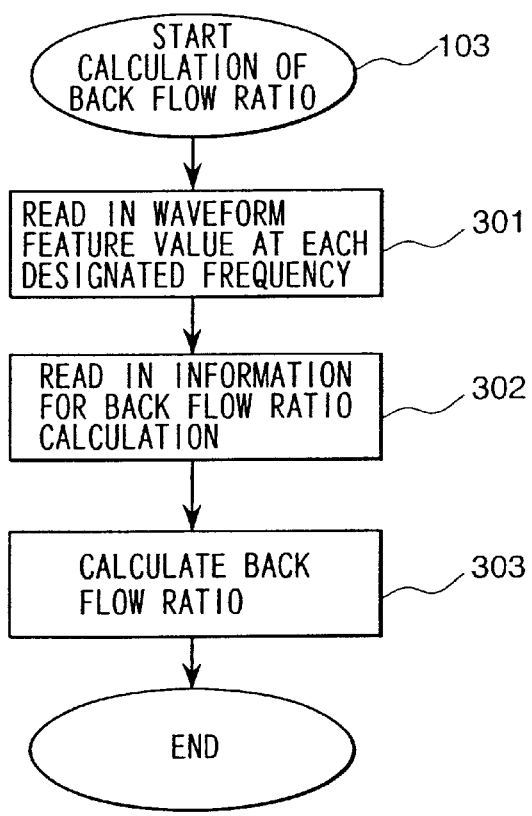

After the waveform feature value extraction is completed, in step 103, the back flow ratio R is calculated based on the extracted waveform feature values, that is, the frequency component strength $F(\omega_i)$. Calculation of the back flow ratio R will be explained with reference to FIG. 7C.

In step 301, the back flow ratio calculation part 8 reads out each frequency component strength $F(\omega_i)$ from the memory 64 for storing waveform feature values, and in step 302, further read out information used for back flow ratio calculation from the memory 10 for storing information used for back flow ratio calculation. This information used for back flow ratio calculation is used to calculate the back flow ratio R expressed as a function of the frequency component strength $F(\mathbf{107}_i)$ and the ratios $F(\omega_i)/F(\omega_j)$. For example, if the back flow ratio is expressed by a function of the frequency component strength F(ωj) and the ratios $F(\omega_i)/F(\omega_j)$, the data of the information used for back flow ratio calculation are stored in the data storage in a way such as that shown in FIG. 9D. Here, it was found by the inventors that the back flow ratio R can be expressed by the following equation (5).

$$R = \sum_k \left\{ \sum_i \phi_{ik} F(\omega_i)^k + \sum_{i,j} \Upsilon_{ijk} \left( \frac{F(\omega_i)}{F(\omega_j)} \right)^k \right\}, \qquad (5)$$

where $F(\omega_i)$ and $F(\omega_j)$ indicate the frequency component strength at the designated angular frequencies $\omega_i$ and $\omega_j$, and k is the degree of the polynomial (5).

In step 303, the back flow ratio is obtained by using the equation (5). Here, $\phi_{ik}$ and $\gamma_{ijk}$ do not depend on the structure or type of the internal combustion engine and the air intake system.

Figure 7D:
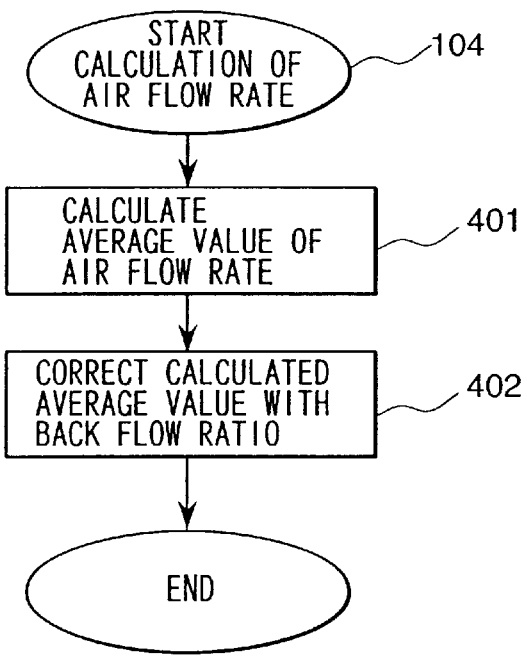

After the back flow ratio R calculation executed in step 103 is completed, in step 104, the correct intake air flow rate is calculated with the corrected output signal of the hot-wire type air flowmeter 1, which has been corrected in step 101, and with the obtained back flow ratio R. Calculation of the correct intake air flow rate will be explained with reference to FIG. 7D.

In step 401, the flow rate calculation part 104 calculates the average value of the corrected output signal Md of the hot-wire type air flowmeter 1, which has been already corrected for delay and non-linearity, over one revolution period of the crank. Further, in step 402, the correct intake air flow rate is obtained by multiplying the calculated average value of the corrected output signal Md by a factor of (1−R)/(1+R).

By the above calculational processing, an intake air flow rate measurement apparatus which is capable of stably correcting the output signal of the hot-wire type air flowmeter 1 for the back flow effect can be obtained, without preparing a correction map for the back flow effect, regardless of the structure or type of the internal combustion engine and the air intake system.

The present invention makes use of the fact that even if the structure or type of an internal combustion engine and an air intake system is changed, the change is reflected on values of frequency component strength in the waveform of the output signal of the hot-wire type air flowmeter 1. Therefore, if the relationship between the frequency component strength and the back flow ratio is once obtained as the information used for back flow ratio calculation, it becomes possible to provide an air flow rate measurement system in which adjustment for back flow calculation is not necessary for each type of internal combustion engine or air intake system. In the following, the manner of obtaining the information used for back flow ratio calculation will be explained.

Figure 10:
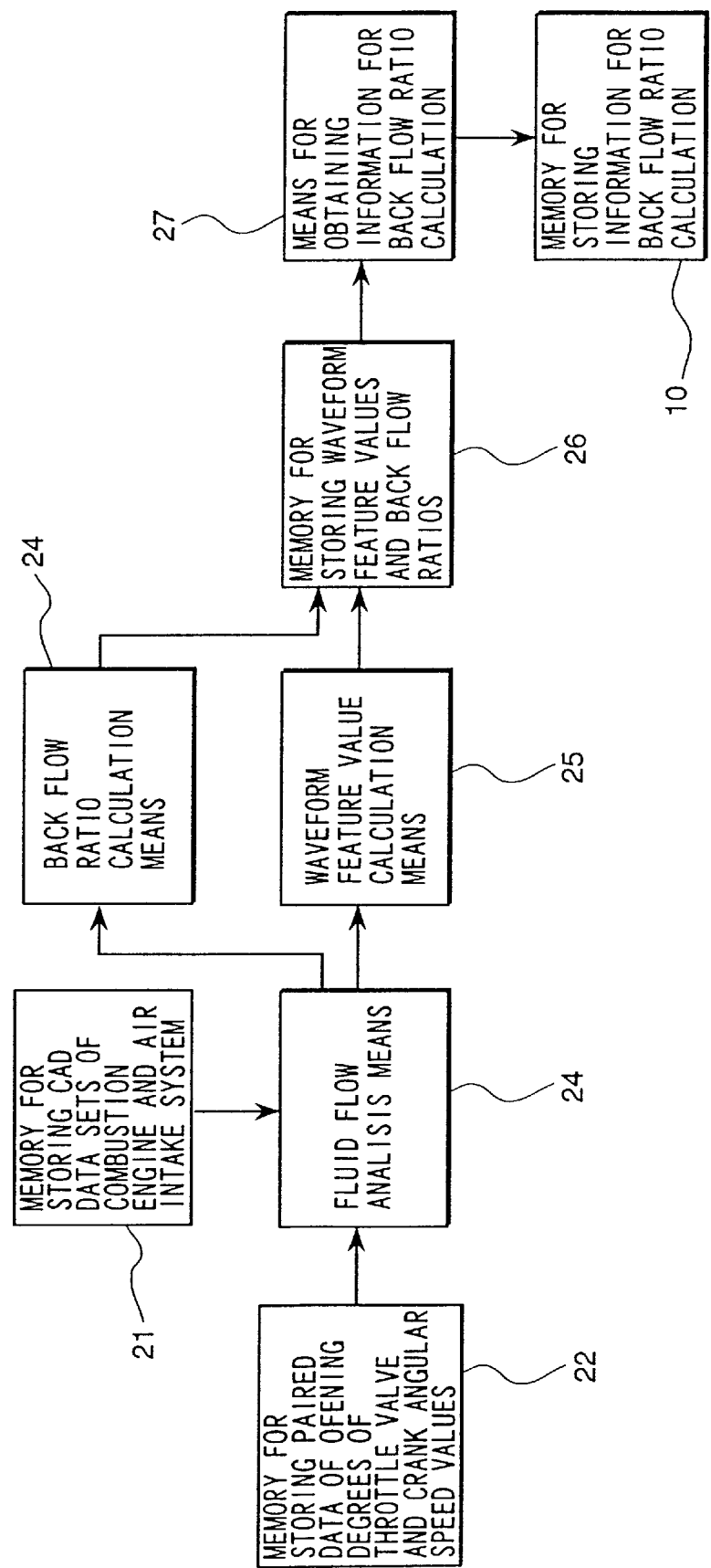
FIG. 10 is a schematic block diagram showing the composition of the apparatus for obtaining information for calculation of the back flow ratio.

FIG. 10 schematically shows the composition of the apparatus for obtaining information for calculation of the back flow ratio.

A fluid flow analysis means 23 calculates changes in pressure and temperature distributions in the manifold 2 and the cylinder 3 with the data stored in a memory 21 for storing CAD data sets of internal combustion engines and air intake systems and in a memory 22 for storing paired data of opening degrees of a throttle valve and crank angular speed values. Further, a fluid flow analysis means 23 calculates the flow rate of intake air at the cross section in the intake air passage, at which the hot-wire type air flowmeter 1 is provided, based on the calculated changes of the distributions. Furthermore, the waveform of an output signal of the hot-wire type air flowmeter 1 is calculated based on the calculated flow rate of intake air.

Next, a waveform feature value calculation means 25 extracts waveform feature values from the waveform, which has been calculated by the fluid flow analysis means 23, of the calculated output signal of the hot-wire type air flowmeter 1. Further, a back flow ratio calculation means 24 obtains the back flow ratio based on the flow rate of intake air at the cross section at which the hot-wire type air flowmeter 1 is provided, which has been calculated by the fluid flow analysis means 23. The obtained waveform feature values and the back flow ratio are stored in a memory 26 for storing waveform feature values and back flow ratios.

A means 26 for obtaining information used for back flow ratio calculation calculates parameters of the function to obtain the back flow ratio, using the waveform feature values based on pairs of back flow ratios and groups of waveform feature values, and stores the calculated parameters in the memory 10 for storing information used for back flow ratio calculation. By using the above obtained information used for back flow ratio calculation, even if the structure or type of the internal combustion engine and the air intake system change, effects of the change are reflected on the waveform of the output signal of the hot-wire type air flowmeter 1, and the flow rate of the intake air can be corrected for the effect of the back flow based on the waveform feature values. Thus, it becomes possible to obtain the correct average value of intake air flow rate, corrected for the effect of the back flow also.

Figure 12:
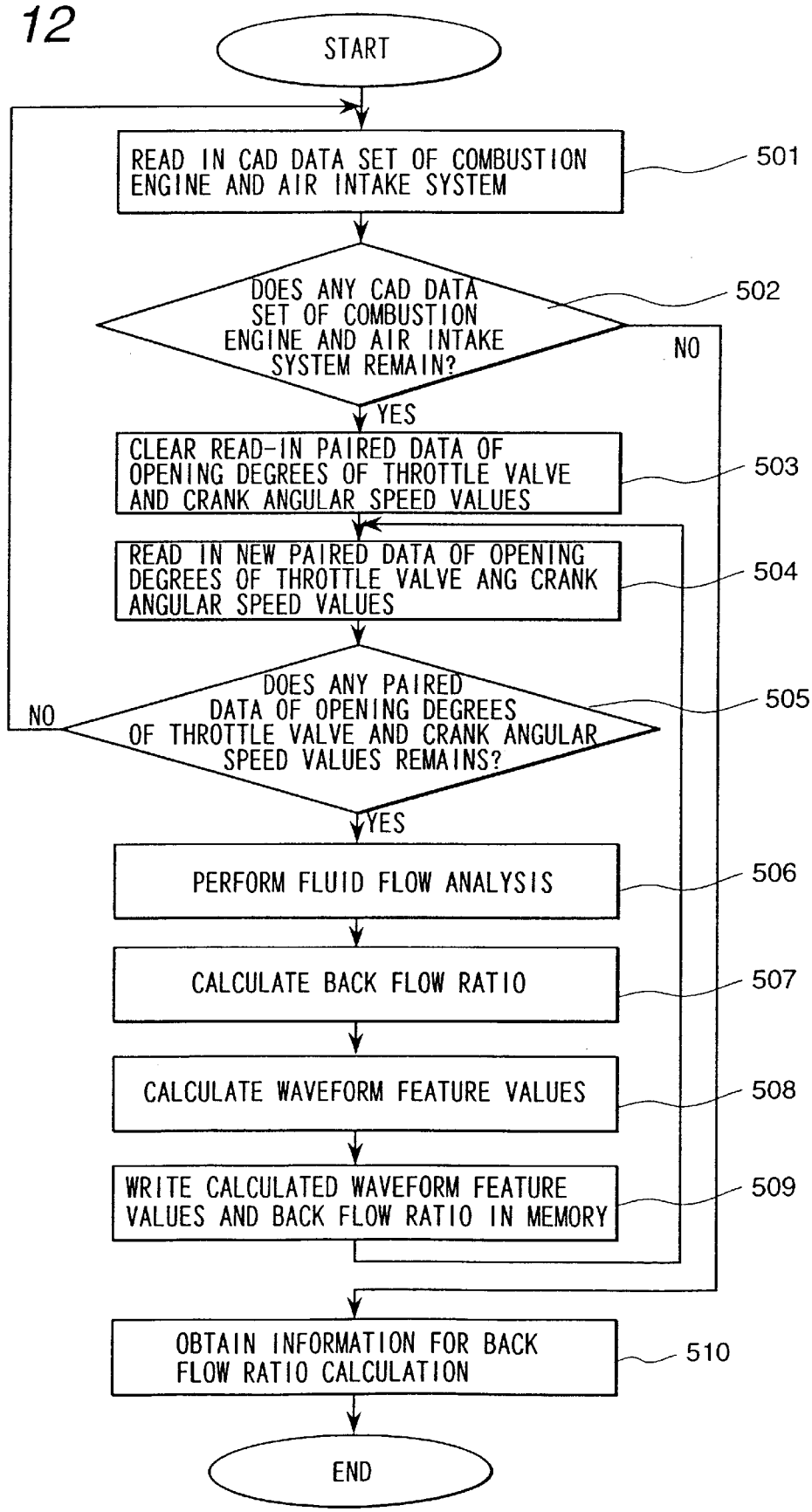
FIG. 12 is a flow chart of processing executed by the apparatus for obtaining information used for calculation of the back flow ratio.

The processing employed for obtaining the information used for back flow ratio calculation will be explained with reference to the flow chart shown in FIG. 12.

Figure 11A:
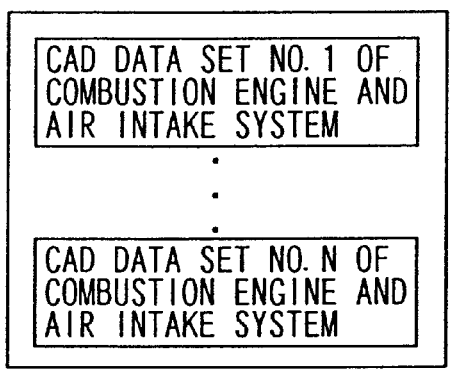
FIGS. 11A–11C are diagrams showing an arrangement of data stored in respective memories provided in the apparatus for obtaining information used for calculation of the back flow ratio.
Figure 11B:
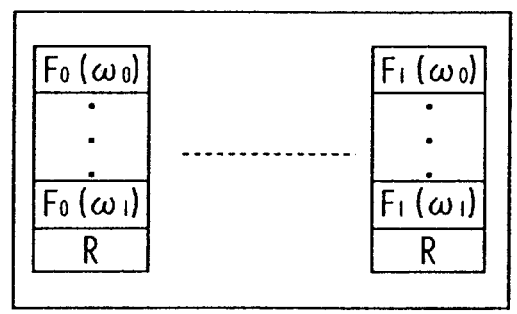

CAD data sets for various types of internal combustion engines and air intake systems are stored in the memory 21 in the arrangement such as that shown in FIG. 11A. Each of the CAD data sets of No. 1 to No. N corresponds to one of various combinations of internal combustion engines and air intake systems. In step 501, the fluid flow analysis means 23 reads out the CAD data sets in turn from the memory 21. Further, in step 502, it is determined whether or not any CAD data set remains. If no CAD data set remains, the processing goes to step 510 for obtaining information used for back flow ratio calculation.

Next, in step 503, if one CAD data set is read in, the paired data (history) of the opening degrees of the throttle valve and the crank angular speed values are initialized. Thus, the preparation for the reading-in of the CAD data set from the top pair of the paired data (history) of the opening degrees of the throttle valve and the crank angular speed values is finished.

Figure 11C:
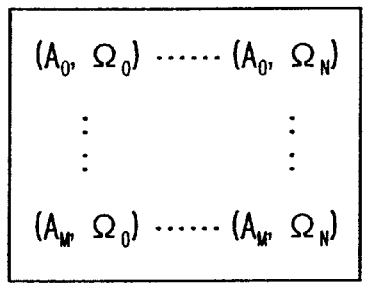

In step 504, the paired data (history) of the opening degree a of the throttle valve and crank angular speed values $\omega$ are read in one by one from the memory 22 for storing paired data of opening degrees of a throttle valve and crank angular speed values. In memory 22, the paired data (history) of the opening degrees A of the throttle valve and the crank angular speed values $\Omega$ are stored with a data composition such as that shown in FIG. 11C. In step 505, it is determined whether or not any paired data (history) of opening degrees A of the throttle valve and crank angular speed values $\Omega$ remains. If no paired data (history) of opening degrees A of the throttle valve and crank angular speed values $\Omega$ remains in the memory 22, the processing returns to step 501, and the next CAD data set is read in.

In step 506, for the read-in paired data (history) of the opening degrees of the throttle valve and the crank angular speed values and the read-in CAD data set, fluid flow phenomena are analyzed, and a waveform of an output signal of the hot-wire type air flowmeter 1 is obtained. The above processing in step 501 to step 506 is executed by the fluid flow analysis means 23.

Next, in step 507, the back f low ratio calculation means 24 calculates the back flow ratio based on the obtained waveform. In step 508, the waveform feature value calculation means 25 further calculates waveform feature values based on the obtained waveform. Since the method of calculating waveform feature values is the same as that explained with reference to FIG. 7B, a detailed explanation of this method will be omitted.

In step 509, a combination of a group of the obtained waveform feature values and the obtained back flow ratio is written in a memory 26 for storing waveform feature values and back flow ratios.

Thus, one combination of the group of the calculated waveform feature values and the calculated back flow ratio is written in a memory 26 for storing waveform feature values and back flow ratios, and the processing again returns to step 504. Further, the above processing is repeated for the next read-in paired data (history) of opening degrees of the throttle valve and crank angular speed values.

After repeating the above processing for all the CAD data sets of the internal combustion engines and the air intake systems and for all the paired data (histories) of opening degrees of a throttle valve and crank angular speed values, the writing of the calculated waveform feature values and the calculated back flow ratios in the memory 26 is completed. Further, a means 27 for obtaining information used for back flow ratio calculation reads out each combination of a group of waveform feature values and a back flow ratio from the memory 26, and obtains information used for back flow calculation. Each group of waveform feature values and each back flow ratio are described as follows.

$$[F_1(\omega_0), \ldots, F_1(\omega_p)] \tag{6}$$

$$R_1 \tag{7}$$

Here, the suffix 1 corresponds to one of the combinations of the CAD data sets for one pair of the internal combustion engines and the air intake systems and one history of the paired data of opening degrees of a throttle valve and crank angular speed values. The information used for back flow ratio calculation is obtained as coefficients $\Phi_{ik}$ and $\gamma_{ijk}$ which minimize the value of the equation (8). That the coefficients $\Phi_{ik}$ and $\gamma_{ijk}$ minimize the value of the equation (8) means that the back flow ratio obtained by the equation (5) with these coefficients can be most correctly applied to all the internal combustion engines and air intake systems.

$$\sum_{l}\left[R_{l} - \sum_{k}\left\{\sum_{i}\phi_{ik}F_{l}(\omega_{i})^{k} + \sum_{i,j}\gamma_{ijk}\left(\frac{F_{l}(\omega_{i})}{F_{l}(\omega_{j})}\right)^{k}\right\}\right] \qquad (8)$$

Therefore, even if the structure or type of the internal combustion engine and the air intake system is changed, it becomes possible to accurately correct the output signal of the hot-wire type air flowmeter 1 with this information used for the back flow calculation, that is, the coefficients $\Phi_{ik}$ and $\gamma_{ijk}$. In step 510, the obtained information used for the back flow calculation is written in the memory 10 for storing information used for back flow calculation.

Thus, it becomes possible to obtain the correct intake air flow rate using the output signal of the hot-wire type air flowmeter 1 by performing correction for the effect of the back flow on the output signals, which results in a highly accurate engine control without a time delay.

Figure 13:
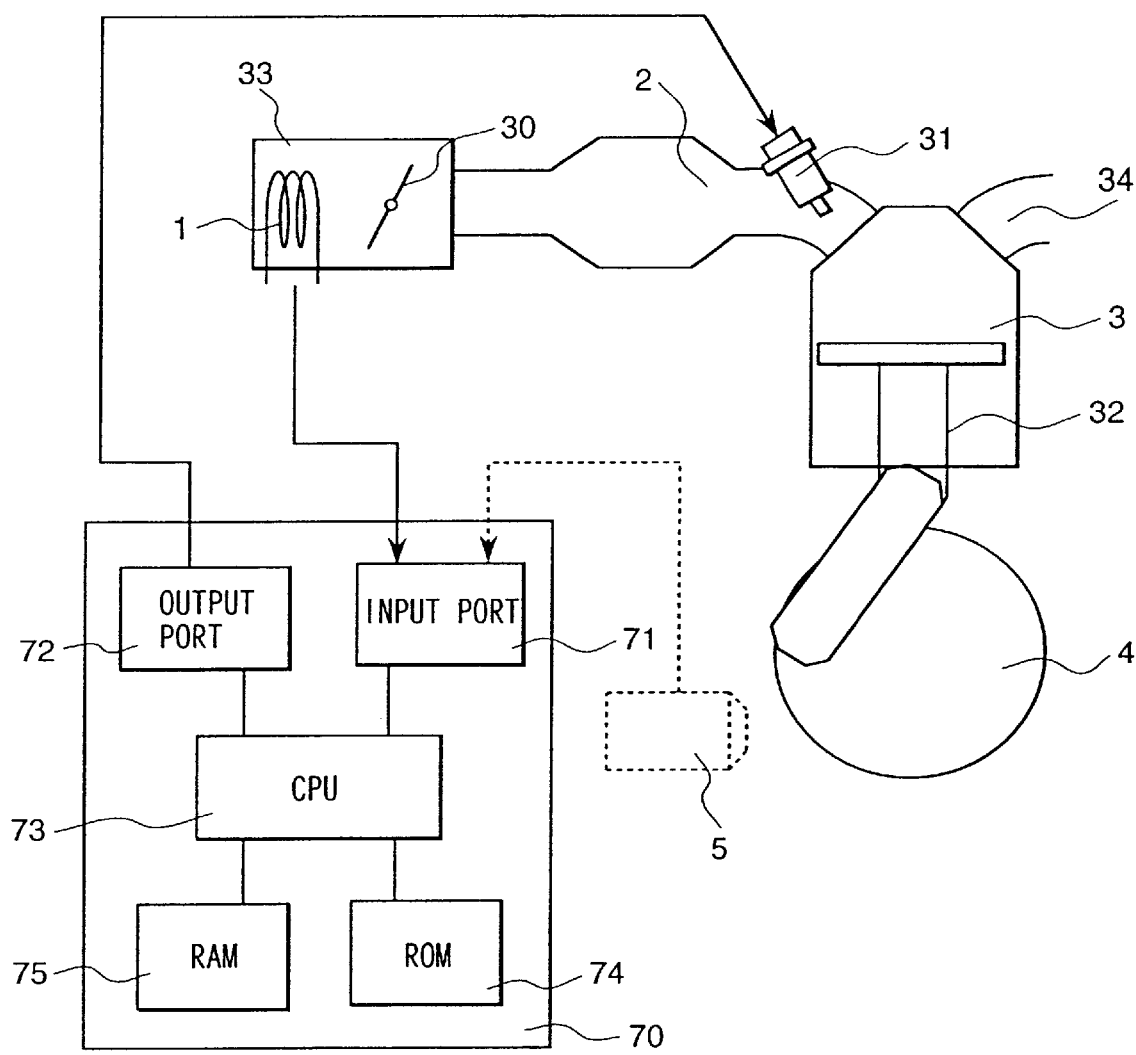
FIG. 13 is a diagram schematically showing the overall composition of an intake air flow rate measurement apparatus representing another embodiment according to the present invention.

FIG. 13 schematically shows the overall composition of an intake air flow rate measurement apparatus of another embodiment according to the present invention. The flow rate of intake air fed to the cylinder 3 of the engine is calculated by an engine control unit (ECU) 70 based on the output signals of the hot-wire type air flowmeter 1 and the crank angle sensor 5. Further, the fuel injection amount is obtained based on the calculated flow rate of intake air, and is fed to the 20 injector.

The engine control unit 70 includes an input port 71, an output port 72, a CPU 73, a ROM 74, and a RAM 75. A program for performing the above described corrections of the output signal sent from the hot-wire type air flowmeter 1 is 25 stored in the ROM 74.

The output signal from the crank angle sensor 5 is input to the ECU 70 via the input port 71. The output signal of the hot-wire type air flowmeter 1 is generally an analog signal whose value is proportional to the flow rate of intake air, and the output signal of the crank angle sensor 5 is generally a pulse signal generated at every predetermined angle change. In this embodiment, the input port 71 is composed of an A/D converter and a counter circuit (not shown in this figure).

Further, the ECU 73 reads out the memorized program from the ROM 74 and performs the corrections of the output signal sent from the hot-wire type air flowmeter 1 to obtain the correct flow rate of intake air, using the read-out program and the output signal of the crank angle sensor 5. Temporary data generated in the course of the above corrections are written in the RAM 75, and necessary data is read out of the RAM 75. The obtained correct flow rate of intake air is output via the output port 72.

Although a hot-wire type air flowmeter is used as an air flowmeter in the above embodiments, the air flowmeter is not restricted to a hot-wire type air flowmeter, and any type of air flowmeter, such as an electrothermal resistor type air flowmeter, which cannot discriminate the direction of air flow and possesses a response delay and non-linearity, can be used in the present invention In the accordance with the present invention, since waveform feature values of a waveform of an output signal sent from an electrothermal resistor type air flowmeter are calculated, and a back flow ratio is obtained by inputting the calculated waveform feature values into a function independent of the type or structure of an internal combustion engine and an air intake system, the correct flow rate of intake air into the internal combustion engine can be measured without determining the occurrence of back flow by using the threshold value or peak values of the output signal sent from electrothermal resistor type air flowmeter, and without preparing a map expressing the relationship between back flow ratio and a pair of an opening degree of a throttle valve and a crank angle speed value.

What is claimed is:

1. An intake air flow rate measurement apparatus for measuring a flow rate of intake air taken in an internal combustion engine, using an electrothermal resistor type air flowmeter, said intake air flow rate measurement apparatus comprising:

a back flow ratio calculation part to calculate a back flow ratio based on frequency component strength of a waveform of changes in a measured flow rate of the intake air; and a flow rate calculation part to calculate a correct flow rate of the intake air based on said waveform of changes in said measured flow rate of the intake air and said back flow ratio output from said back flow calculation part.

2. An intake air flow rate measurement apparatus according to claim 1, wherein said measured flow rate is obtained by performing correction of an output signal of said electrothermal resistor type air flowmeter for a response delay and a non-linearity of said electrothermal resistor type air flowmeter.

3. An intake air flow rate measurement apparatus according to claim 2, wherein said back flow ratio is obtained by the following equation:

$$R = \sum_{k}\left\{\sum_{i}\phi_{ik}F(\omega_{i})^{k} + \sum_{i,j}\gamma_{ijk}\left(\frac{F(\omega_{i})}{F(\omega_{j})}\right)^{k}\right\},$$

where $F(\omega_i)$ and $F(\omega_j)$ indicate frequency component strength at designated angular frequencies $\omega_i$ and $\omega_j$ and k is a degree of a polynomial of said equation.

4. An intake air flow rate measurement apparatus according to claim 1, wherein said back flow ratio is obtained by the following equation:

$$R = \sum_{k}\left\{\sum_{i}\phi_{ik}F(\omega_{i})^{k} + \sum_{i,j}\gamma_{ijk}\left(\frac{F(\omega_{i})}{F(\omega_{j})}\right)^{k}\right\},$$

where $F(\omega_i)$ and $F(\omega_j)$ indicate frequency component strength at designated angular frequencies $\omega_i$ and $\omega_j$, and k is a degree of a polynomial of said equation.

* * * * *